United States Patent [19]
Fuelling, Jr. et al.

[11] 3,958,398
[45] May 25, 1976

[54] STARTER INTERLOCK FOR SELF-PROPELLED LAWN MOWER

[75] Inventors: William Fuelling, Jr.; Herbert A. Jespersen, both of Galesburg, Ill.

[73] Assignee: Outboard Marine Corporation, Waukegan, Ill.

[22] Filed: July 24, 1974

[21] Appl. No.: 491,367

[52] U.S. Cl.............................. 56/10.5; 56/11.8; 123/179 K
[51] Int. Cl.².......................................... A01D 75/20
[58] Field of Search................. 56/10.5, 10.8, 11.1, 56/11.8, 14.7; 123/179 K

[56]             References Cited
           UNITED STATES PATENTS

| | | | |
|---|---|---|---|
| 2,947,132 | 8/1960 | Shaw..................................... | 56/11.1 |
| 3,626,676 | 12/1971 | Miley et al............................. | 56/10.5 |
| 3,731,471 | 5/1973 | Bening.................................. | 56/10.5 |
| 3,736,729 | 6/1973 | Peterson............................... | 56/10.5 |

*Primary Examiner*—J. N. Eskovitz
*Attorney, Agent, or Firm*—Michael, Best & Friedrich

[57]              ABSTRACT

Disclosed herein is a self-propelled lawn mower including a prime mover, a drive mechanism selectively connecting the prime mover in driving engagement with the mower wheels and including a control mechanism movable between a drive position and a neutral or non-driving position and a starter interlock connected to the control mechanism for preventing initiation or starting of the prime mover when the control mechanism is in the drive position. In one embodiment, the prime mover is an internal combustion engine having a starter gear and the starter interlock mechanism includes a blocking element movable relative to a position blocking axial movement of a starter pinion towards engagement with the starter gear to start the engine and a push-pull element connecting the blocking element to the control mechanism for moving the blocking element in response to movement of the control mechanism. In another embodiment, the starter interlock mechanism includes a pivotally mounted pawl which is connected to the control mechanism and is engageable with one of a plurality of circumferentially-spaced, stop abutments provided on the face of a pull rope pulley to prevent rotation of the pulley when the control mechanism is in the drive position. In a further embodiment, the prime mover is an electric motor and the starter interlock mechanism includes a member which selectively actuates a switch in the mower electrical circuit to a circuit interrupting position, thereby preventing the motor from being energized when the control mechanism is in the drive position.

14 Claims, 5 Drawing Figures

U.S. Patent May 25, 1976 3,958,398
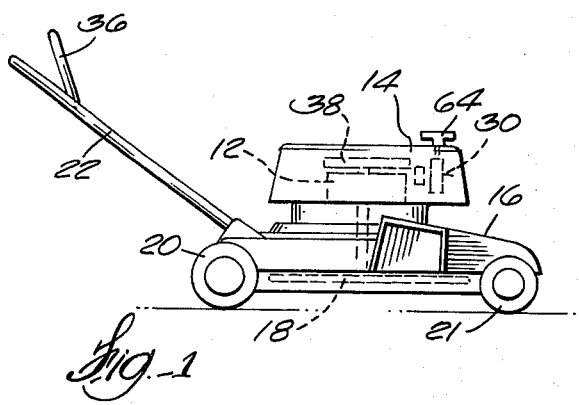
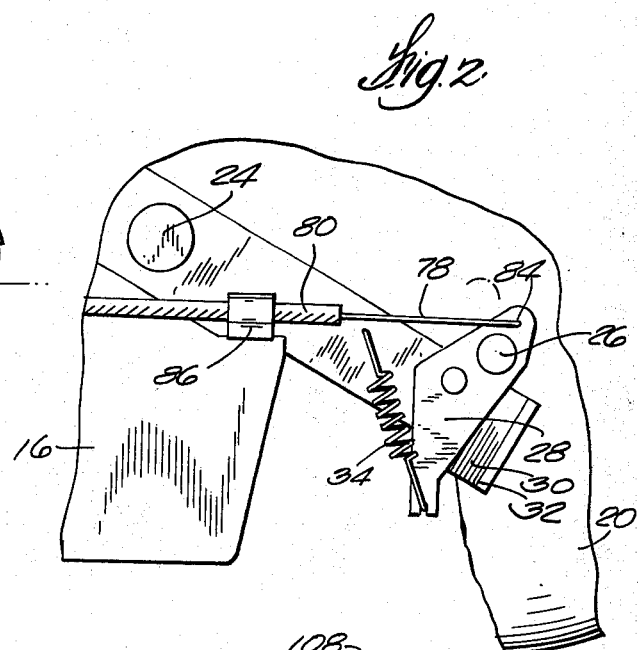
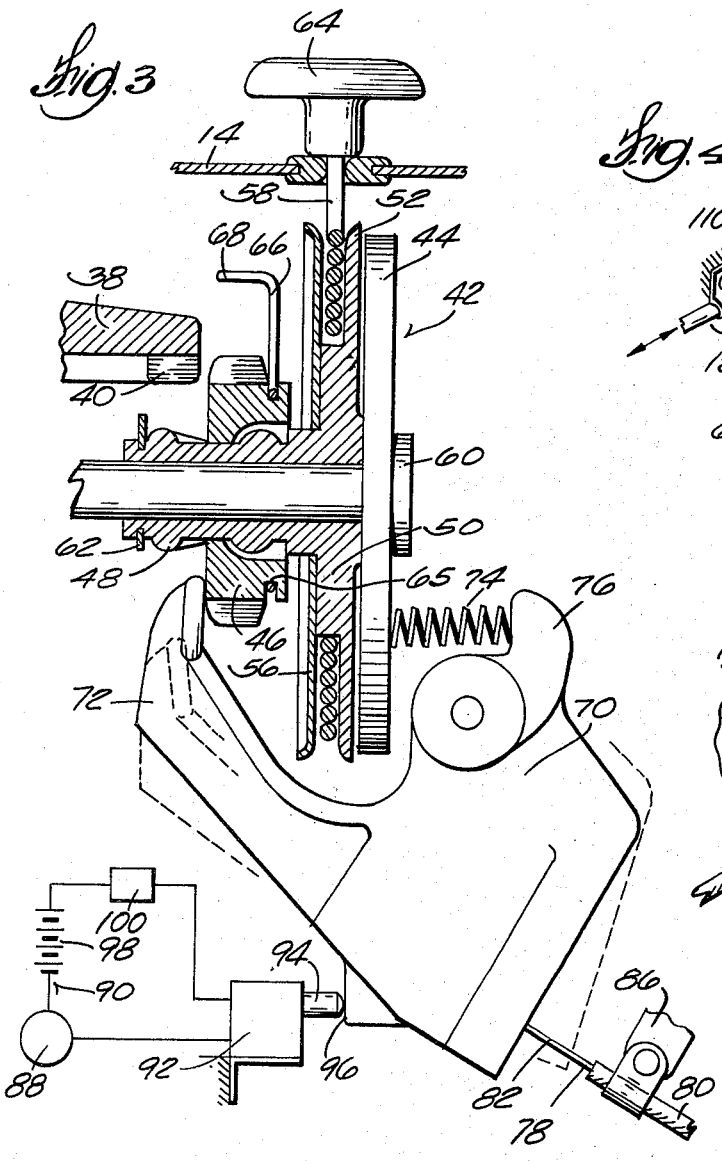
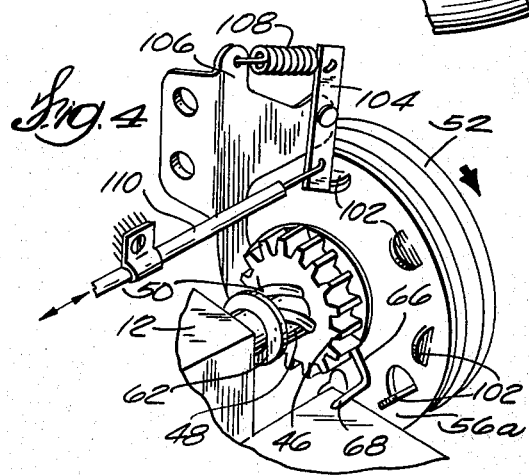
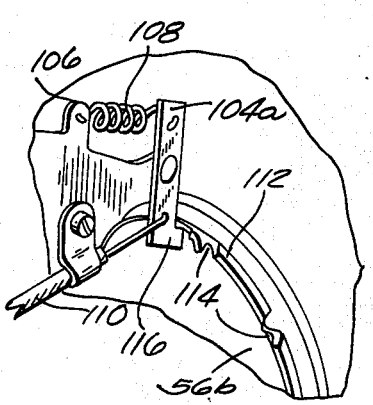

STARTER INTERLOCK FOR SELF-PROPELLED LAWN MOWER

BACKGROUND OF THE INVENTION

This invention relates to self-propelled lawn mowers and, more particularly, to self-propelled lawn mowers including a drive mechanism movable between a drive position and a neutral or non-driving position.

In the past, it has been possible to start the prime mover of some self-propelled lawn mowers when the drive mechanism is in a drive position. Such a condition is highly undesirable for various reasons, including a potential safety hazard to the operator and bystanders.

SUMMARY OF THE INVENTION

Broadly, the invention provides a lawn mower including a rotary member, such as a drive wheel and a drive mechanism for connecting an internal combustion engine to the rotary member, which mechanism is movable betweem a drive position and a neutral or non-driving position, and means for preventing initiation or starting of an internal combustion engine when the drive mechanism is in the drive position.

More particularly, in accordance with one embodiment of the invention, the self-propelled lawn mower includes an engine starter gear, a starter mechanism having a rotatable starter shaft, a starter pinion carried on the starter shaft for movement relative to the starter shaft into an engaged position in mesh with the starter gear in response to rotation of the starter shaft, and means connected to the starter shaft for rotating the starter shaft to start the engine, a drive mechanism connected between the engine and the drive wheel for propelling the mower and having a control means for moving the drive mechanism between a drive position and a neutral or non-driving position, and a starter interlock mechanism connected to the control means for preventing the starter pinion from meshing with the starter gear in the event rotation of the starter shaft is attempted with the drive mechanism in the drive position.

In one preferred embodiment of the invention, the starter interlock mechanism includes a blocking element movable relative to a position preventing axial movement of the starter pinion into meshing engagement with the starter gear, and means connecting the blocking element to the control means for moving the blocking element in response to movement of the control means so that the blocking element is in the blocking position when the drive mechanism is in the drive position.

In another preferred embodiment of the invention, the starter shaft carries a circular member on which a starter rope is wound and the starter interlock mechanism includes a plurality of circumferentially spaced abutment means on the one face of the circular member, a pawl movable relative to a position abuttingly engaging one of the abutment means to prevent rotation of the starter shaft and means connecting the pawl to the control means so that the pawl is in an operating or locking position when the drive mechanism is in the drive position.

When the lawn mower includes an electric starter for initiating engine operation, there is provided in the mower electrical circuit, a normally closed switch which includes actuation means for selectively moving the switch to a position interrupting the circuit to the electric starter. The starter interlock mechanism includes means for actuating the switch actuation means and moving the switch to the circuit-interrupting position when the mower drive mechanism is in the drive position.

One of the principal features of the invention is the provision of a self-propelled lawn mower including a starter mechanism which is operable to initiate engine starting only when the drive mechanism is not in the drive position.

Another of the principal features of the invention is a provision of a self-propelled lawn mower including a starter mechanism having a starter pinion carried on a rotatable starter shaft for relative axial movement to meshingly engage an engine starting gear and a starter interlock mechanism arranged to permit or prevent movement of the starter pinion into a starter gear engaging position in response to the condition of the mower drive mechanism.

A further principal feature of the invention is the provision of a self-propelled lawn mower including a rotatable starter shaft for starting the engine and a starter interlock mechanism arranged to permit or prevent rotation of the starter shaft in response to the condition of the mower drive mechanism.

A further principal feature of the invention is the provision of a self-propelled lawn mower including an electrical circuit having a starter motor for starting the mower engine and a starter interlock mechanism which is arranged to selectively interrupt the electrical circuit and permit or prevent energization of the starter motor in response to the condition of the mower drive mechanism.

Other features and advantages of the invention will become apparent upon reviewing the following detailed description, the drawing and the appended claims.

BRIEF DESCRIPTION OF THE DRAWINGS

FIG. 1 is a side elevational view of a self-propelled lawn mower embodying various of the features of the invention.

FIG. 2 is an enlarged fragmentary, side elevation view, partially in section, of a portion of the drive mechanism incorporated in the lawn mower of FIG. 1.

FIG. 3 is an enlarged fragmentary view, partially in section, of the engine starter mechanism of the lawn mower in FIG. 1 and a first embodiment of the starter interlock assembly.

FIG. 4 is an enlarged, fragmentary view of a second embodiment of the starter interlock assembly.

FIG. 5 is an enlarged, fragmentary view of a third embodiment of the starter interlock assembly.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Illustrated in the drawing is a self-propelled lawn mower 10 including a prime mover 12, such as an internal combustion engine or an electric motor, partially covered by a shroud 14 and supported on a frame including a blade housing 16. The prime mover 12 drives a rotary cutter blade 18 located inside the blade housing 16. The lawn mower 10 is supported for travel along the ground by front and rear wheels 20 and 21 and includes a handle 22 for guiding the mower.

A suitable drive mechanism is provided for selectively connecting the prime mover 12 in driving engagement with one or more of the wheels. While other arrangements can be used, in the specific construction illustrated, the drive mechanism is generally arranged in a manner disclosed in the U.S. Shaw Pat. No. 2,947,132 issued Aug. 2, 1960, which patent is incorporated herein by reference. FIG. 2 is similar to the righthand portion of FIG. 5 of the Shaw patent. The construction and operation of the drive mechanism will be briefly summarized and reference can be made to the Shaw patent for a more detailed description. The components illustrated in FIG. 2 corresponding to those illustrated and described in the Shaw patent include the reference numerals of that patent in parentheses.

Referring to FIG. 2, the drive mechanism includes a drive shaft 24 (35) which is drivingly connected to the prime mover 12, such as by the pulley and gear arrangement disclosed in the Shaw patent. Located on the opposite ends of the drive shaft 24 are knurled driving rollers (not shown, corresponding to 38 and 39 in FIGS. 2 and 3 of the Shaw patent) which are drivingly engageable with the rear wheels 20. The rear wheels 20 are rotatably mounted on a support axle 26 (40) which, at the opposite ends, is carried by actuators or links 28 (one shown, corresponding to 41 of the Shaw patent) projecting upwardly from the arms 30 (one shown, corresponding to 43 of the Shaw patent) of a yoke 32 (45). The links 28 carry the support axle 26 and accommodate fore and aft movement of the rear wheels 20 for engagement with and disengagement from the driving rollers on the drive shaft 24. A spring 34 connected between the links 28 and the yoke arm 30 serves to bias the rear wheels 20 clockwise and out of engagement with the drive shaft 24.

Pivotally mounted on the guiding handle 22 for controlling engagement and disengagement of the rear wheels 20 is a control handle 36 (FIG. 1). The control handle 36 is connected to the support axle 26 through a suitable linkage arrangement, for selectively moving the rear wheels 20 between the drive position where the rear wheels are engaged with the drive shaft 24 and a neutral or non-driving position where the rear wheels 20 are disengaged from the drive shaft 24. In the Shaw patent the linkage includes the actuating link 68, the lever 72 and the lever 74 illustrated in FIGS. 6 and 7. When the control handle 36 is in the drive position (i.e., the forward position shown in FIG. 1), the link 28 moves counterclockwise as viewed in FIG. 2 and against the action of the spring 34 to engage the wheels 20 with the drive shaft 24, and when the control handle is moved to a neutral or non-driving position (i.e., moved rearwardly as viewed in FIG. 1), the link 28 assumes the position shown in FIG. 2 with the rear wheels 20 out of engagement with the drive shaft 24.

In the specific construction illustrated, the prime mover 12 is an internal combustion engine and includes a rotatable flywheel 38 carrying an engine starter gear 40 (FIG. 3). Mounted on the mower is an engine starter mechanism 42 which is adapted to be actuated so as to engage the starter gear 40 and rotate the engine for starting. While various arrangements can be used, in the specific construction illustrated, the starting mechanism 42 includes a cylindrical frame or housing 44 fixed relative to the engine 12, a starter pinion 46 which is meshable with starter gear 40, and means for rotating the starter pinion 46 and axially displacing it between a retracted position axially spaced from the starter gear 40 and an advanced position in driving engagement with the starter gear 40. This last-mentioned means includes a combined pulley and worm drive gear assembly which is rotatable relative to the housing 44 and includes a drive worm 48 carrying the starter pinion 46.

More particularly, the combined pulley and drive assembly has a drive member 50 including the drive worm 48 and a first circular pulley member 52. A second circular pulley member 56 is connected to the drive member 50 and cooperates with the first pulley member 52 to form a pulley for a pull rope 58. The drive member 50 is mounted on a shaft or pin 60 for rotation relative to the housing 44. Located near the outer end of the drive worm 48 is a retainer 62 for limiting the axial advance of the starter pinion 46 towards the starter gear 40.

The pull rope 58 includes a handle 64 and is normally wound up on the pulley formed between the pulley members 52 and 56 by a rewind or recoil spring (not shown) which is located inside the housing 44 and has one end anchored to the drive member 50 with the other end anchored to the inside of the housing 44. Mounted in an annular groove 65 on the starter pinion 46 for common axial movement with the starter pinion is a drag spring 66 which frictionally restrains rotary movement of the starter pinion. The drag spring 66 includes an offset leg 68 which, after initial rotation of the starter pinion 46, engages a fixed portion of the mower (as shown in FIG. 4) to prevent further rotation of the drag spring 66 even though the starter pinion 46 continues to rotate.

In operation, when the pull rope 58 is pulled, the drive worm 48 rotates in a clockwise direction as viewed in FIG. 4 to uncoil or unwind the recoil spring inside the housing 44. Upon release of the pull rope 58, the recoil spring recoils or rewinds and thereby rotates the drive worm 48 in a counterclockwise direction, simultaneously rewinding the pull rope 58 on the pulley. In response to the clockwise rotation of the drive worm 48 during pulling of the pull rope 58, the drag spring 66 frictionally restrains rotation of the starter pinion 46 causing the starter pinion 46 to travel axially on the drive worm 48 from the retracted position to the advanced starter gear engagement position. Upon engaging the retainer 62, the starter pinion 46 meshes with the starter gear 40 and rotates with the drive worm 48, while rotating relative to the drag spring 66, to drive the starter gear 40.

As thus far described, the construction is generally conventional. The invention encompasses lawn mowers employing an electrically driven starter as well as starter mechanisms in which the starter pinion is displaced to the starter gear engaging position in response to rotation accompanying unwinding of a recoil spring which previously has been tensioned by a pull rope or other recoil spring tensioning means. Also, lawn mowers using reel-type cutter blades are within the scope of the invention.

In accordance with one embodiment of the invention, a starter interlock mechanism or means is provided for preventing the starter pinion 46 from meshing with the starting gear 40 when rotation of the drive member 50 is attempted with the drive mechanism in the drive position.

The specific starter interlock mechanism illustrated in FIG. 3 includes a blocking element 70 which is movable between a blocking position to prevent movement of the starter pinion 46 towards the starter gear engaging position and an unblocking position and means for moving the blocking element 70, in response to movement of the control handle 36, to the blocking position when the control handle is moved to the drive position. The blocking element 70 is pivotally mounted on the mower and includes an arm 72 which is engageable with the starter pinion 46 (when the blocking element 70 is in the solid line position shown in FIG. 3) to prevent axial movement of the starter pinion towards the starter gear engaging position. When the blocking element 70 is pivoted counterclockwise, as viewed in FIG. 3, to the dashed line position, the starter pinion 46 is free to move toward the starter gear engaging position. A spring 74 seated against the housing 44 and bearing against an ear 76 provided on the blocking element 70 urges the blocking element 70 towards the blocking position.

While other arrangements can be used, in the specific construction illustrated, the means for moving the blocking element 70 in response to movement of the control handle 36 includes a semi-flexible, push-pull element or wire 78 slidably mounted in a guide conduit 80. One end 82 of the wire 78 is connected to the blocking element 70 (FIG. 3) and the other end 84 is connected to the link 28 (FIG. 2). The guide conduit 80 is retained in place by brackets 86 mounted on the mower. If desired, the blocking element 70 can be connected directly to the control handle 36 by a push-pull element similar to the push-pull element 78.

In the specific construction illustrated in FIG. 3, the mower includes an electric starter (illustrated diagrammatically at 88) operatively connected to the engine 12 for starting and the pull rope 58 is used as an optional starting initiation means. Interconnected in the mower starter circuit 90 (shown diagrammatically) is a conventional on/off electrical switch 92 which includes an actuation plunger 94 engageable with a shoulder 96 on the blocking element 70. When the blocking element 70 is in the solid line position, i.e., when the control lever 36 is in the driving position, the blocking element shoulder 96 engages the switch plunger 94 and opens the switch 92, interrupting the electrical circuit from the battery 98 to the starter motor 88. In this condition, the engine cannot be started either manually or electrically. When the blocking element 70 is in the dashed line position shown in FIG. 3, i.e., the control handle 36 is in a neutral or non-driving position, the blocking element shoulder 96 is spaced from the switch plunger 94 and the switch 92 is closed, thereby completing the circuit so that the engine can be started either electrically or manually.

For lawn mowers which do not include the optional manual starting feature, the blocking element 70 does not have to include the arm 72. Otherwise, the blocking element is arranged to selectively actuate the switch 92 in generally the same manner as described above.

In accordance with the alternate embodiment illustrated in FIG. 4, the starter interlock mechanism is arranged to prevent full rotation of the starter member 50 when the control handle 36 is in the drive position. In this embodiment, the starter interlock mechanism includes a plurality of circumferentially spaced, axially extending stops 102 located on the outer face of the circular member 56a. A lever or pawl 104 is pivotally mounted for movement between an operating position where the pawl 104 can abuttingly engage one of the stops 102 to prevent rotation of the starter member 50 and a non-operating position axially spaced from the stops 102 (as shown in FIG. 4) where the circular members 52 and 56a, and thus the starter member 50, can be rotated to start the engine. The stops 102 can be arranged in any suitable manner to serve as a stop abutment for the pawl 104. In the specific construction illustrated in FIG. 4, the stops 102 are in the form of tabs formed integrally from the circular member 56a.

The pawl 104 is pivotally mounted on a bracket 106 which in turn is mounted on the mower. Connected between the bracket 106 and the pawl 104 for biasing the pawl 104 toward the operating position is a spring 108. A push/pull element 110 having the same general construction as is described above is connected, at one end, to the pawl 104 and, at the other end, is connected either to the drive mechanism lever 28 or directly to the control handle 36 as described above.

FIG. 5 illustrates a modified construction for the embodiment illustrated in FIG. 4. The circular pulley member 56b has an axially extending flange 112 which includes the plurality of circumferentially spaced notches 114 for releasably receiving an offset portion 116 of the pawl 104a to lock the starter member 50 against further rotation and thereby prevent the engine from being started when the control handle 36 is in the drive position. Suitable means, such as a push-pull element, is provided for connecting the pawl 114a to the control handle 36 so that it operates in the same general manner as the embodiment illustrated in FIG. 4.

What is claimed is:

1. A lawn mower comprising a frame, a cutter blade rotatably supported on said frame, a ground engaging wheel rotatably mounted on said frame and supporting said frame for movement along the ground, an engine supported on said frame for driving said cutter blade and having a starter gear, a starter mechanism including a rotatable starter shaft, a starter pinion carried on said shaft for movement relative to said shaft in response to rotation of said shaft to an engaged position in mesh with said starter gear, and means connected to said shaft for rotating said shaft to start said engine, a drive mechanism for selectively connecting said engine in driving engagement with said wheel to propel the mower, said drive mechanism including a control means which is movable between a drive position where said engine is drivingly engaged with said wheel and a neutral position where said engine is disengaged from said wheel, and a starter interlock means operably connected to said control means for preventing said starter pinion from meshing with said starter gear when rotation of said starter shaft is attempted with said control means in the drive position.

2. A lawn mower according to claim 1 wherein said starter pinion is carried on said shaft for axial movement relative to said shaft and said starter interlock means includes a blocking element pivotally mounted for movement between a blocking position to prevent movement of said starting pinion into meshing engagement with said starter gear and unblocking position to permit movement of said starter pinion into engagement with said starter gear, and further includes means connecting said blocking element to said control means for moving said blocking element in response to movement of said control means such that the blocking element is in the blocking position when said control means is in the drive position and said driving element is in the non-blocking position when the said control means is in a neutral position.

3. A lawn mower according to claim 2 wherein said control means includes an actuating means connected to said control handle for moving said wheel into and out of driving engagement with said drive mechanism and said connecting means includes a push/pull element extending between said blocking element and said actuating means.

4. A lawn mower according to claim 2 including means for biasing said blocking element toward the blocking position.

5. A lawn mower according to claim 1 wherein said means for rotating said shaft includes a circular member mounted on said shaft and a starter rope wound on said circular member and having one end affixed to said circular member and a free end which is pulled to rotate said starter shaft, and said starter interlock means includes a plurality of circumferentially spaced abutment means on one face of said circular member, a pawl movably mounted for movement between an operating position where said pawl is engageable with one of said abutment means to prevent rotation of said shaft and a non-operating position where said pawl is not engageable with said abutment means, and means connecting said pawl to said control means for moving said pawl in response to the movement of said control means such that said pawl is in the operating position when said control means is in the drive position and said pawl is in the non-operating position when said control means is in a neutral position.

6. A lawn mower according to claim 5 including means for biasing said pawl towards the operating position.

7. A lawn mower according to claim 6 wherein said abutment means comprises a plurality of circumferentially spaced, axially projecting tabs formed integrally from said circular member.

8. A lawn mower according to claim 5 wherein said circular member includes an axially extending, annular flange, and said abutment means comprises a plurality of circumferentially spaced notches in said flange for receiving said pawl and locking said shaft against rotation when said control means is in the operating position.

9. A lawn mower according to claim 1 including an electric starter for starting said engine, an electrical circuit for interconnecting said electric starter with a source of electrical power, a switch connected in said electrical circuit and having actuation means for selectively moving said switch to a position interrupting the circuit between said electric starter and said electrical power source, and wherein said starter interlock means includes means for actuating said switch actuation means and moving said switch to the circuit-interrupting position when said control means is in the drive position.

10. A lawn mower including a frame, a cutter blade rotatably supported on said frame, a ground wheel rotatably mounted on said frame and supporting said frame for movement of the mower along the ground, an internal combustion engine having an electric starter for starting said engine, a drive mechanism for selectively connecting said engine in driving engagement with said wheel to propel the mower, said drive mechanism including a control means which is movable between a drive position where said engine is drivingly engaged with said wheel and a neutral position where said engine is disengaged from said wheel, and means for preventing said engine from being started when said control means is in said drive position, said means for preventing engine starting including an electrical circuit for interconnecting said electric starter with a source of electric power, a switch connected in said electric circuit and having an actuation means for selectively moving said switch to a position interrupting the circuit between said electric starter and said electrical power source, and said means for preventing engine starting further including means actuating said switch actuation means to move said switch to a circuit interrupting position when said control means is in said drive position.

11. A lawn mower comprising a frame, a rotatable member supported on said frame, an engine supported on said frame for driving said rotatable member and having a starter gear, a starter mechanism including a rotatable starter shaft, a starter pinion carried on said shaft for movement relative to said shaft in response to rotation of said shaft to an engaged position in mesh with said starter gear, and means connected to said shaft for rotating said shaft to start said engine, a drive mechanism for selectively connecting said engine in driving engagement with said rotatable member, said drive mechanism being movable between a first position where said engine is drivingly engaged with said rotatable member and a second position where said engine is disengaged from said rotatable member, and a starter interlock means operably connected to said drive mechanism for preventing said starter pinion from meshing with said starter gear when rotation of said starter shaft is attempted with said drive mechanism in the first position.

12. A lawn mower including a frame, a rotatable member supported on said frame, an internal combustion engine having an electric starter for starting said engine, a drive mechanism for selectively connecting said engine in driving engagement with said rotatable member, said drive mechanism being movable between a first position wherein said engine is drivingly engaged with said rotatable member and a second position wherein said engine is disengaged from said rotatable member, and means for preventing said engine from being started when said drive mechanism is in said first position, said means for preventing engine starting including an electrical circuit for interconnecting said electric starter with a source of electric power, a switch connected in said electric circuit and having an actuation means for selectively moving said switch to a position interrupting said circuit between said electric starter and said electrical power source, said means for preventing engine starting further including means for actuating said switch actuation means to move said switch to a circuit interrupting position when said drive mechanism is in said first position.

13. A lawn mower including a frame, a cutter blade rotatably supported on said frame, a ground wheel rotatably mounted on said frame and supporting said frame for movement of the mower along the ground, an internal combustion engine having an electric starter for starting said engine, a drive mechanism for selectively connecting said engine in driving engagement with said wheel to propel the mower, said drive mechanism including a control means which is movable between a drive position where said engine is drivingly engaged with said wheel and a neutral position where said engine is disengaged from said wheel, and means for preventing said engine from being started when said control means is in said drive position, said means for preventing engine starting including an electrical circuit for interconnecting said electric starter with a source of electric power, a switch connected in said electric circuit and being selectively operable to interrupt said circuit between said electric starter and said electrical power source, and said means for preventing engine starting further including means for operating said switch to interrupt said circuit when said control means is in said drive position.

14. A lawn mower including a frame, a rotatable member supported on said frame, an internal combustion engine having an electric starter for starting said engine, a drive mechanism for selectively connecting said engine in driving engagement with said rotatable member, said drive mechanism being movable between a first position wherein said engine is drivingly engaged with said rotatably member and a second position wherein said engine is disengaged from said rotatable member, and means for preventing said engine from being started when said drive mechanism is in said first position, said means for preventing engine starting including an electrical circuit for interconnecting said electric starter with a source of electric power, a switch connected in said electric circuit and being selectively operable to interrupt said circuit between said electric starter and said electrical power source, said means for preventing engine starting further including means for operating said switch to interrupt said circuit when said drive mechanism is in said first position.

* * * * *